No. 694,246. Patented Feb. 25, 1902.
E. F. BRIGGS.
NUT LOCK.
(Application filed June 7, 1901.)
(No Model.)

Witnesses:
R. G. Orwig
J. R. Hindley

Inventor E. F. Briggs,
By
Orwig & Lane
Attys.

THE NORRIS PETERS CO., PHOTO-LITHO., WASHINGTON, D. C.

UNITED STATES PATENT OFFICE.

EDWIN F. BRIGGS, OF DES MOINES, IOWA.

NUT-LOCK.

SPECIFICATION forming part of Letters Patent No. 694,246, dated February 25, 1902.

Application filed June 7, 1901. Serial No. 63,534. (No model.)

*To all whom it may concern:*

Be it known that I, EDWIN F. BRIGGS, a citizen of the United States, residing at Des Moines, in the county of Polk and State of Iowa, have invented certain new and useful Improvements in Nut-Locks, of which the following is a specification.

This invention relates to that class of nut-locks in which an ordinary bolt is used without longitudinal grooves or flat surfaces.

My object is to provide a device of this class of simple, durable, and inexpensive construction, in which the parts to be clamped together are secured and held just as firmly as though the ordinary nut-bolt were used, and at the same time the nut is positively prevented from turning backwardly upon the bolt after it has once been set.

A further object is to provide a device of this class in which the locking member may be removed from engagement with the ratchet-face of the nut, so that the nut may be unscrewed, and a further object is to provide a device of this class in which a nut may be tightened at any time in the same manner as an ordinary nut.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1:
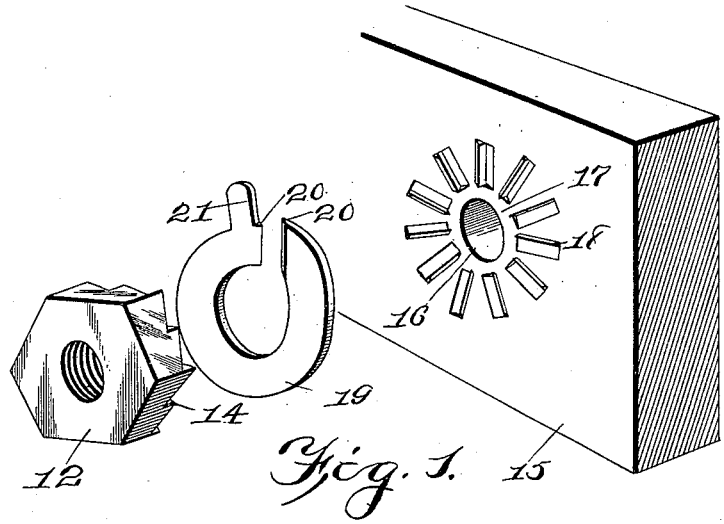
Figure 2:
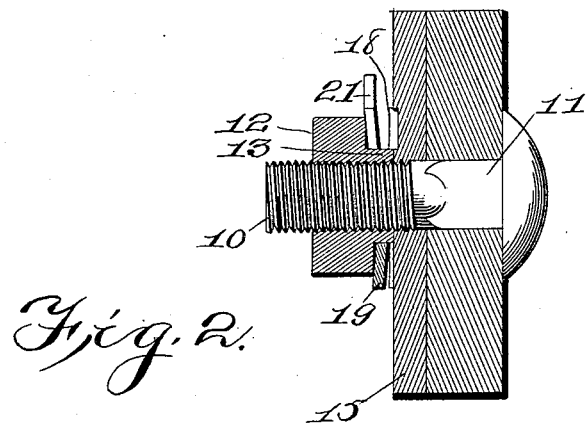

Figure 1 shows in perspective the nut proper, the locking member, and the ratchet-faced block or washer to be engaged by the locking member; and Fig. 2 shows a sectional view illustrating two articles clamped together and securely locked by means of my improved nut-lock.

Referring to the accompanying drawings, I have used the reference-numeral 10 to indicate a bolt of ordinary construction, preferably having a squared portion near its head, said portion being indicated by the numeral 11.

The nut proper is indicated by the reference-numeral 12 and is internally screw-threaded. On its rear face is an annular rim 13 of an exterior diameter considerably less than that of the nut. On the rear face of the nut, between the annular rim and the periphery of the nut, is a series of radial ratchet-teeth 14.

The reference-numeral 15 indicates a block of metal or a washer having an opening 16 through which the bolt 10 may be passed. Surrounding the opening on one face of the washer or block is a smooth surface 17, designed to receive the rim 13, and projecting radially from this surface 17 is a series of ratchet-teeth 18.

The locking member comprises a spring-metal plate 19, round at its periphery, and having a central opening large enough to admit the rim 13. The plate 19 is divided and its adjacent ends are beveled in opposite directions at 20, and on one of the end portions of the plate 19 is a radial projection 21.

In practical use it is obvious that the ordinary bolt may be used, and when its squared portion 11 is seated in a block of wood or metal the bolt cannot turn. The parts to be clamped together have the bolt passed through them, and where it is possible the radial ratchet-teeth 18 are formed on the surface of one of the articles to be clamped together. Where this is not possible, a separate plate or washer 15 is supplied. Then the locking-disk is placed on the annular rim 13 and the nut is screwed to the bolt in the ordinary manner. Before the annular rim 13 engages the side of the articles to be clamped together one of the ends of the locking member will have engaged the ratchet-teeth 18 and the other end of the locking member will be in engagement with the ratchet-teeth on the nut. Obviously as the nut is further advanced to engage the articles to be clamped together the locking member will be partially compressed and its ends held firmly in engagement with the said ratchet-faces. However, the shoulder 13 will engage the articles to be clamped before the locking member has been pressed flat. Therefore it is obvious that if it is desired to unlock the nut it is only necessary to engage the projection 21 and force it toward the other end of the locking member, thereby releasing the nut and permitting it to be unscrewed. Furthermore, the nut may be readily and easily tightened at any time in the ordinary manner.

The number of the ratchet-teeth 18 is immaterial, and obviously the same result will be produced by providing a projection on the locking member to enter a hole bored in the block 15 adjacent to the opening 16.

Having thus described my invention, what I claim, and desire to secure by Letters Patent of the United States therefor, is—

An improved nut-lock, comprising in combination a bolt, an internally-screw-threaded nut for the bolt having on one face an annular projection surrounding the bolt-opening and also having on the same face a series of radial ratchet-teeth extending from the projection toward the periphery of the nut, a spring-metal washer designed to be mounted on the annular projection and divided on a radial line at one side, the divided ends being extended in opposite directions, one end being designed to engage the ratchet-teeth on the nut, a radial projection at one end of the washer extending beyond the periphery of the nut, said washer being of materially less thickness than the thickness of the annular projection, and a block having an opening therein to receive the bolt and having radial ratchet-teeth surrounding said opening, said block being designed to be secured to the articles to be clamped together by the bolt and to have the bolt passed through it and to have one end of the spring-washer engage its ratchet-teeth, said block also being designed to be engaged by the annular projection of the nut, substantially as and for the purposes stated.

EDWIN F. BRIGGS.

Witnesses:
J. RALPH ORWIG,
W. R. LANE.